2 Sheets--Sheet 1.

J. P. COLLINS.

Water-Wheels.

No. 5,407.

Reissued May 13, 1873.

*Witnesses.*

Alex Mahon

J. T. Thomas

*Inventor.*

James P. Collins by A. M. Smith

Attorney

2 Sheets--Sheet 2.

J. P. COLLINS.

Water-Wheels.

No. 5,407. Reissued May 13, 1873.

Witnesses
Alex Mahon
J. J. Thomas

Inventor
James P. Collins
by A. M. Smith
Attorney

UNITED STATES PATENT OFFICE.

JAMES P. COLLINS, OF NORWICH, CONNECTICUT.

IMPROVEMENT IN WATER-WHEELS.

Specification forming part of Letters Patent No. 26,339, dated December 6, 1859; reissue No. 979, dated June 19, 1860; reissue No. 5,407, dated May 13, 1873; application filed June 16, 1871.

*To all whom it may concern:*

Be it known that I, JAMES P. COLLINS, formerly of Troy, in the county of Rensselaer and State of New York, but now of Norwich, New London county, Connecticut, have invented certain new and useful Improvements in Water-Wheels, of which the following is a full, clear, and exact description, reference being had to the annexed drawing making a part of this specification, in which—

Figure 1:
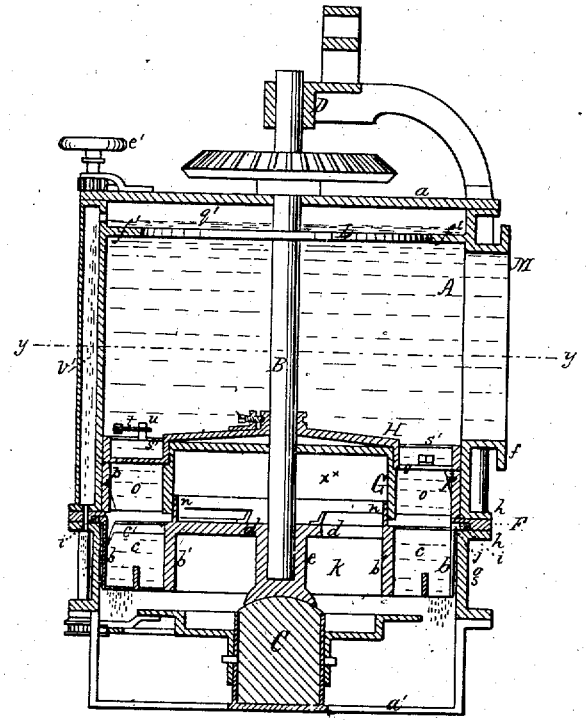
Figure 3:
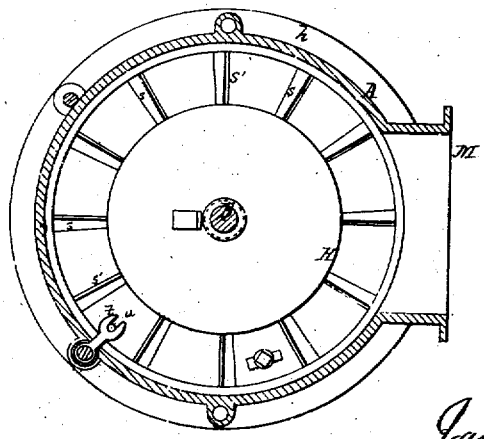
Figure 2:
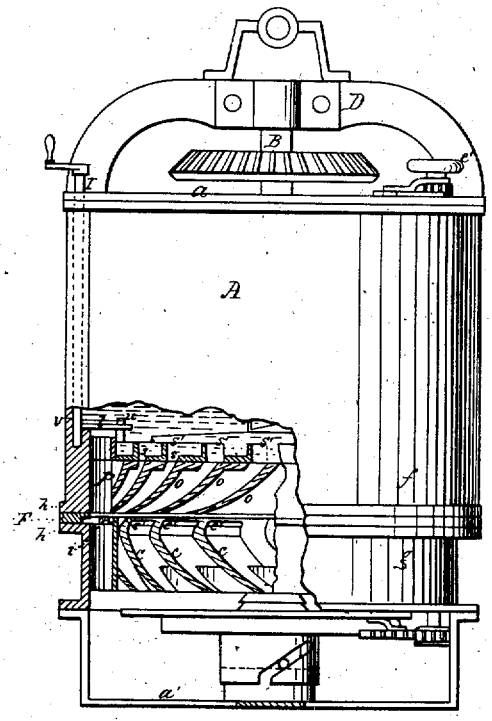
Figure 4:
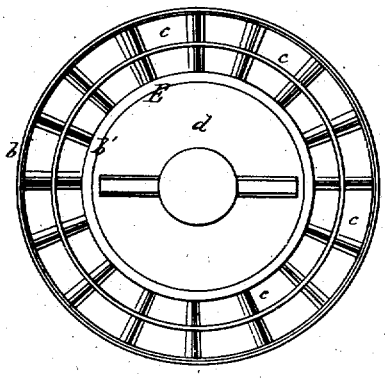

Figure 1 is a vertical section of a water-wheel constructed according to my invention; Fig. 2, a side view of same with a portion broken away; Fig. 3, a horizontal section of same taken in the line *y y*, Fig. 1; Fig. 4, a detached inverted plan of the wheel.

Similar letters of reference indicate corresponding parts in the several figures.

The invention relates to certain improvements in that class of water-wheels which are generally known as turbine-wheels.

The object of my invention is to counteract the pressure of the water upon the revolving wheel, and thereby prevent the injurious frictional resistance and consequent rapid wear of the step or bearing resulting therefrom. Also, to prevent the weight due to the superincumbent column of water from which the wheel derives its motion from acting on the central web or plate of the revolving wheel, thereby further reducing the friction upon the step or pivot upon which the wheel revolves; and, finally, to prevent injurious frictional contact between the revolving and stationary parts of a water-wheel.

I attain the first object named by availing myself of the well-known hydrostatic principle that fluids will press in all directions with equal force, and I employ this action of the water as a means for counterbalancing not only the superincumbent weight of the water upon the buckets but also the weight of the wheel itself with that of its shaft and gearing.

The particular construction which I have shown for attaining these several objects will be best understood from the following description with reference to the drawing, in which—

A represents a cylinder having a head, *a*, fitted on its upper end, and B represents a vertical shaft which is fitted centrally within the cylinder A, the lower end of the shaft resting on a step or bearing, C, which is placed at the bottom of the cylinder A. The upper end of the shaft B has its bearings at the center of the cross-bar D. E represents the wheel, which is secured to the lower part of the shaft B. This wheel is formed of two rims or annular flanges, *b b′*, between which the buckets *c* are placed. The inner rim or plate *b′* is connected by a central plate, *d*, with the hub or boss *e* of the wheel, and the outer rim or plate *b* is connected to the rim or plate *b′* by its buckets *c*, which are bolted between the two rims, *b b′*. The form or shape of the buckets *c* is shown in Fig. 2. The upper end of each bucket *c* has a lip or projecting flange, *c′*, formed on it, as shown in Fig. 2. These lips or flanges project over the faces of the buckets sufficiently far to prevent the water from being deflected upward, and they keep the whole of the water that first strikes the buckets within the wheel and compel it to pass downward and be discharged at the lower ends of the buckets. If the lips or flanges *c′* were not employed, there would be, to a certain extent, a reaction against the descending water in consequence of the water that first strikes the buckets being deflected upward; and this resistance would, of course, detract from the effective power of the wheel. The cylinder A is formed of two parts, *f g*, provided with flanges *h* at their abutting ends and secured together by screw-bolts. Between the two flanges *h h* a flat ring or annular plate, F, is interposed. This ring or plate F has a rabbet formed in its under side, and its inner edge and this rabbet receives a ring, *i*, which encompasses a flange, *j*, in the upper part of the wheel E. (See Fig. 1.) The flange *j* of the wheel is fitted snugly within the ring *i*, forming a water-tight joint, or as tight as may be; but said ring *i* is allowed a certain degree of lateral play or movement in its rabbet, and, consequently, if from any cause the wheel should be slightly eccentric in its action, said irregular movement will be compensated for by this movement or play that is allowed the ring. The wheel E, it will be seen, is within the lower part of the cylinder A, and the head or plate *d* forms a cover for the central chamber *k* of the wheel. G represents a circular box, which is permanently secured within the lower end of the upper part *f* of the cylinder A, and the lower end of box G is fitted around an annular flange, *n*, at the edge of the plate *d*. It is designed to have the lower end of the box G fit around the flange *n*, so as to form a joint as nearly water-tight as may be, and, if necessary, a ring or annular plate similar to *i* may be interposed between the flange and box. To the outer side of the box G curved plates *o* are attached, and the outer edges of these plates are secured to a rim or annular plate, *p*, which fits snugly within the cylinder A. On the box G a cap, H, is placed. This cap has openings *s* made through it, and by turning the cap H the openings *s* may be made either to register with or to cover the openings or spaces between the curved guides *o*. The openings *s* have each a slightly-inclined plate, *s'*, at one side, as shown clearly in Fig. 2, in order to serve as guides to the water. The cap H is turned by an arm, *t*, the inner end of which is connected with a pin, *u*, on the cap, and the outer end connected with the lower end of a vertical shaft, I, which is fitted in a tube, *v*, attached to the cylinder A. (See Fig. 2.) L is a circular lifting plate, or disk, secured to the shaft B and fitted within a flange, *f'*, on the inner side of the cylinder A, so as to run water-tight, or as nearly so as may be. The space or chamber *q'* above the plate L communicates with the upper end of an outlet or waste-tube, *v'*. (See Fig. 1.) M is the flange to which the induction-pipe is attached. When the wheel is in operation the pressure of the water within the cylinder A against the plate L will relieve the step C of the weight of the wheel E and its shaft and gearing, and, also, of the pressure caused by the action of the water on the wheel, and all water that may leak through between the edge of plate L and the flange *f'* escapes down the tube *v'*. The water is let on the wheel by adjusting the cap H, the plates *o* directing the water properly to the buckets *c* of the wheel E. The chamber $x^{\times}$ within the box G is kept free from water by the flange or ring *n*, and, consequently, the wheel E is relieved of the weight of the water, which would otherwise fill the chamber $x^{\times}$ and press on plate *d* with a force equal to the height of the column of water under which the wheel is working.

Having now described how my invention may be carried out in practice, I wish it to be understood that I do not confine myself to the precise construction and arrangement of parts shown, as it will be obvious that these may be varied without departing from my invention; but

What I do claim as new, and desire to secure by Letters Patent, is—

1. A water-wheel provided with annularly-arranged buckets and a central covering box or cap, in combination with a disk or lifting plate for relieving or counteracting the weight or pressure of the water on the buckets, substantially as described.

2. The ring or flange *n* interposed between the stationary guide and the wheel for preventing access of the water to, and its consequent pressure upon, the center of the wheel, substantially as and for the purpose specified.

3. The combination with a water-wheel provided with annularly-arranged buckets, as described, of a lifting-plate for counteracting the weight of the water on the buckets, and a ring or flange interposed between the wheel and the stationary guide-box or cap for preventing the ingress of water between said wheel and guide-box or cap, as described.

4. The packing-ring *i* fitted within a recess or groove surrounding the wheel, and adapted to move laterally to compensate for wear or irregularities in the movement of the wheel, as described.

JAMES P. COLLINS.

Witnesses:
LUCIUS BROWN,
ELISHA C. RICE.